Patented Mar. 4, 1924.

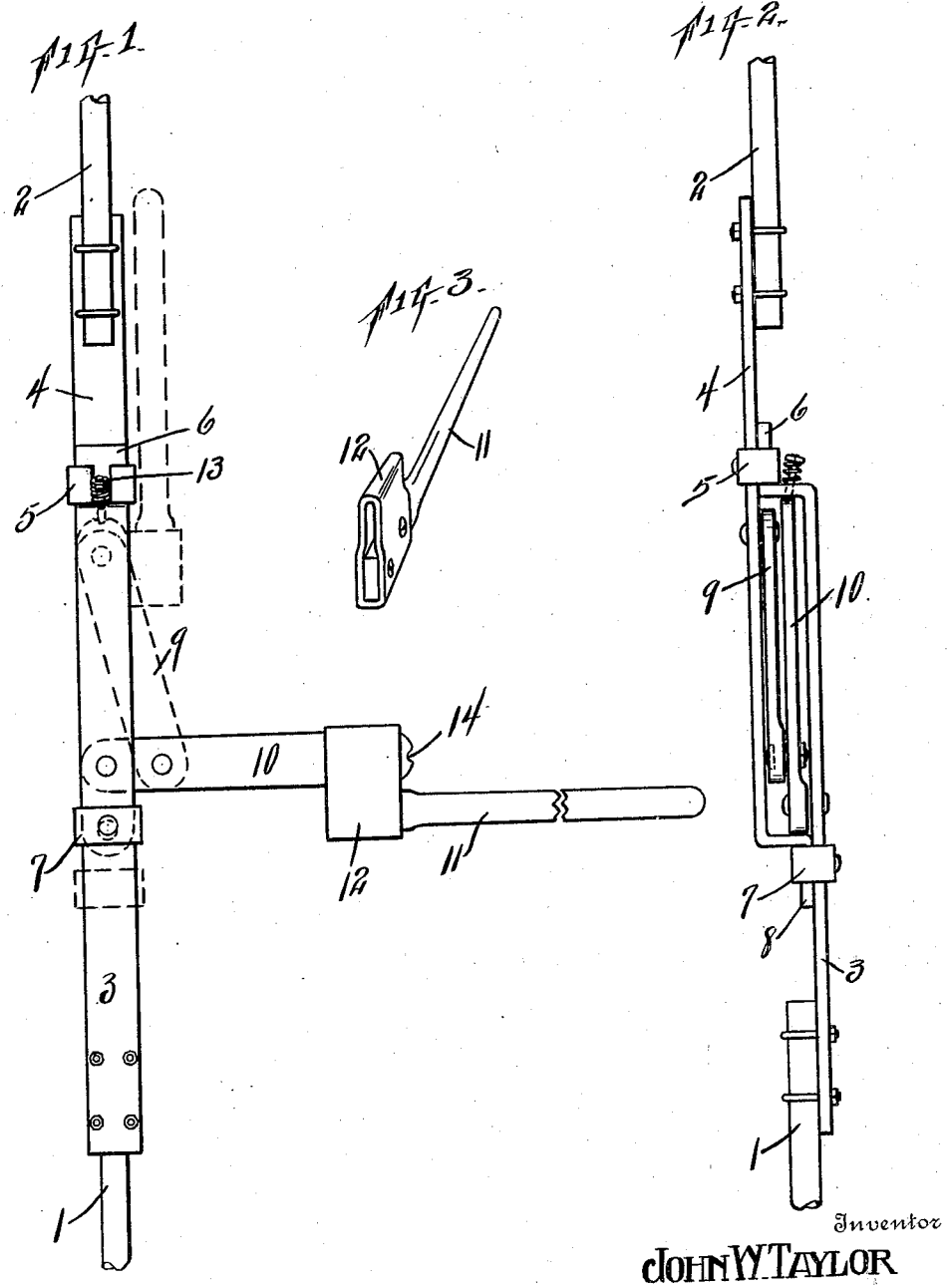

1,485,938

UNITED STATES PATENT OFFICE.

JOHN W. TAYLOR, OF FORT WORTH, TEXAS.

HAND-POWER ATTACHMENT FOR WINDMILL SUCKER RODS.

Application filed July 30, 1923. Serial No. 654,706.

*To all whom it may concern:*

Be it known that I, JOHN W. TAYLOR, a citizen of the United States, residing at Fort Worth, in the county of Tarrant and State of Texas, have invented certain new and useful Improvements in Hand-Power Attachments for Windmill Sucker Rods, of which the following is a specification.

My invention relates to pumps and more particularly to a combination windmill and manually operated pump rod; and the object is to adapt a windmill pump or sucker rod for use as a manually operated pump rod and to accomplish this by simple devices which can be provided at small cost and which will be highly efficient in operation and which can be accomplished without impairing the utility of the windmill operated sucker rod. Another object is to provide a manually operated device without any connection with a stationary object. Other objects and advantages will be fully explained in the following description and the invention will be more particularly pointed out in the claims.

Reference is had to the accompanying drawings which form a part of this application.

Fig. 1 is an elevation of the pump rod connections or attachments. Fig. 2 is an elevation of the same at right angles to the view in Fig. 1. Fig. 3 is a detail view of the hand lever.

Similar characters of reference are used to indicate the same parts throughout the several views.

The drawings show portions of the plunger rod 1 and the windmill rod 2. The hand lever attachments are connected to the members 1 and 2. Extension members 3 and 4 are attached respectively to the members 1 and 2. A guide loop 5 is riveted to a shank 6 of member 3 and the extension member 4 moves freely through the loop 5. A guide loop 7 is riveted to a shank 8 of the extension member 4 and the member 3 moves freely through the loop 7. A fulcrum link 9 is pivotally connected to the extension member 4. A combination hand lever and spacing member 10 is fulcrumed in the link 9 and pivotally connected to the extension member 3. When the device is to be used as a windmill pump rod, the lever 10 is folded in between the members 3 and 4 and between the horizontal portions of the shanks 6 and 8. In this position, the device will operate as an ordinary windmill rod. The manually operated attachments will not interfere with the windmill attachments or operation. The manually operated attachments are not attached to any stationary objects and they move freely with the windmill sucker rod.

The lever 10 is connected to the extension rods 3 and 4 and is provided with a handle 11 which is connected to the handle by a coupling 12 which will project in between the members 3 and 4 and the handle will occupy substantially the dotted outline position shown in Fig. 1 when the device is used as a windmill sucker rod. The handle 11 and lever 10 can be used as an ordinary hand or manually operated pump without interference from the windmill. The device can be used as an ordinary windmill without interference by the hand power attachments. When the device is operated as a windmill sucker rod, the strain is not on the rivets but on the lever 10 which bears against the bent shanks 6 and 8 and the lever 10 is held in place in the positions shown in Figs. 1 and 2 by a spring actuated dog 13 which is projected through the shank 6, the lever 10 having a recess 14 to receive the end of the dog 13.

When the windpower is used the manual lever is folded inwardly and reciprocates with the rods. When it is desired to use the manual power, lever 11 is turned to its horizontal position. The point where link 9 connects with extension 4 acts as fulcrum. Because of the inertia of the windmill gearing (not shown), the extension 4 is immovable, thus permitting the hand lever to reciprocate rod 1 and extension 3, the coupling 5 sliding on extension 4 and extension 3 sliding through coupling 7.

What I claim, is,—

1. Hand pump attachments for sucker rods comprising a severed sucker rod, extension members riveted to the severed ends of said sucker rod, each extension member having a loop which receives the other extension member loosely by which said extension members are guided in their vertical motion, a link bar pivotally connected to one of said extension members, and a lever fulcrumed in said link bar and pivotally connected to the other extension member.

2. Hand pump attachments for sucker rods comprising a severed sucker rod, extension members riveted to the severed ends of said sucker rod, each extension member having a loop which receives the other extension member loosely by which said extension members are guided in their vertical motion, a link bar pivotally connected to one of said extension members, and a lever fulcrumed on said link bar and pivoted on the other extension bar for manual operation and adapted to fold between said extension members for holding said members extended for operation by a windmill.

3. Hand pump attachments for sucker rods comprising a severed sucker rod, extension members riveted to the severed ends of said sucker rod, each extension member having a bent shank and a loop riveted thereto which loop receives the other extension member loosely by which said extension members are guided in their vertical motion, a link bar pivotally connected to one of said extension members, and a lever and a rivet therefor fulcrumed on said link bar and a rivet for pivotally connecting said lever to the other extension member for manual operation and said lever adapted to fold between said extension members and to bear against said shanks for holding said extension members extended for windmill operation and taking the strain off of said rivets.

4. Hand pump attachments for sucker rods comprising a severed sucker rod, extension members riveted to the severed ends of said sucker rod, each extension member having a bent shank and a loop riveted thereto which loop receives the other extension member loosely by which said extension members are guided in their vertical motion, a link bar pivotally connected to one of said extension members, a lever and a rivet therefor fulcrumed on said link bar and a rivet for pivotally connecting said lever to the other extension member for manual operation and said lever adapted to fold between said extension members and to bear against said shanks for holding said extension members extended for windmill operation and taking the strain off of said rivets, and means for holding said lever between said extensions.

In testimony whereof, I set my hand, this 25th day of July, 1923.

JOHN W. TAYLOR.